United States Patent [19]

Potthoff-Karl et al.

[11] Patent Number: 5,122,582

[45] Date of Patent: Jun. 16, 1992

[54] PREPARATION OF COPOLYMERS WHICH FORM CLEAR AQUEOUS SOLUTIONS

[75] Inventors: Birgit Potthoff-Karl, Weinheim; Adolf Nuber, Boehl-Iggelheim; Willy Hinz, Mannheim; Axel Sanner, Frankenthal, all of Fed. Rep. of Germany

[73] Assignee: BASF Aktiengesellschaft, Ludwigshafen, Fed. Rep. of Germany

[21] Appl. No.: 586,153

[22] Filed: Sep. 21, 1990

[30] Foreign Application Priority Data

Sep. 22, 1989 [DE] Fed. Rep. of Germany ....... 3931681

[51] Int. Cl.⁵ .................... C08F 2/10; C08F 226/08
[52] U.S. Cl. ..................... 526/81; 526/212; 526/264; 524/808
[58] Field of Search ............. 526/264, 212, 81; 524/808; 528/500

[56] References Cited

U.S. PATENT DOCUMENTS

| | | | |
|---|---|---|---|
| 4,058,655 | 11/1977 | Denzinger | 526/212 |
| 4,520,180 | 5/1985 | Barabas | 526/212 |
| 4,551,512 | 11/1985 | Straub | 526/264 |
| 4,554,311 | 11/1985 | Barabas | 524/808 |
| 4,816,534 | 3/1989 | Nuber | 526/227 |

FOREIGN PATENT DOCUMENTS 0104042 3/1984 European Pat. Off. .

OTHER PUBLICATIONS

Chemical Abstracts, vol. 110, No. 9, May 1, 1989, Columbus, Ohio.

*Primary Examiner*—Joseph L. Schofer
*Assistant Examiner*—M. Nagumo
*Attorney, Agent, or Firm*—Oblon, Spivak, McClelland, Maier & Neustadt

[57] ABSTRACT

The preparation of copolymers which form clear aqueous solutions from

A) 45 to 90% by weight N-vinylpyrrolidone,
B) 10 to 55% by weight of a vinyl ester and
C) 0 to 10% by weight of other copolymerizable monomers by radical polymerization in an organic solvent in the presence of a radical initiator, and removal of the organic solvent and other volatiles by distillation, entails allowing the polymerization to proceed until the N-vinylpyrrolidone content in the reaction mixture is from 5 to 1% by weight of the N-vinylpyrrolidone amount employed, substantially removing the organic solvent and other volatiles by distillation, adding water to the mixture, again adding a radical initiator and leaving the aqueous solution at from 50° to 100° C. for from 1 to 10 hours, and then removing volatile organic constituents virtually completely by a steam distillation.

4 Claims, No Drawings

PREPARATION OF COPOLYMERS WHICH FORM CLEAR AQUEOUS SOLUTIONS

The present invention relates to an improved process for preparing copolymers which form clear aqueous solutions from A) 45 to 90% by weight N-vinylpyrrolidone,
B) 10 to 55% by weight of a vinyl ester and
C) 0 to 10% by weight of other copolymerizable monomers by radical polymerization in an organic solvent in the presence of a radical initiator, and removal of the organic solvent and other volatiles by distillation.

EP-B 104,042 relates to the preparation of N-vinylpyrrolidone/vinyl acetate copolymers by radical polymerization. It is recommended therein that, after the polymerization has taken place, the alcohol employed as solvent be removed by distillation and, at the same time, water be added.

The N-vinylpyrrolidone/vinyl acetate copolymers which can be obtained by the method of EP-B-104,042 and are mainly employed in hair cosmetics have, however, the disadvantage of yielding only cloudy solutions in water. Clear solutions are obtained only in the presence of, for example alcohols.

It is an object of the present invention to provide a process which yields copolymers which form clear aqueous solutions from the said monomers.

We have accordingly found a process for preparing copolymers which form clear aqueous solutions from A) 45 to 90% by weight N-vinylpyrrolidone,
B) 10 to 55% by weight of a vinyl easter and
C) 0 to 10% by weight of other copolymerizable monomers by radical polymerization in an organic solvent in the presence of a radical initiator, and removal of the organic solvent and other volatiles by distillation, which comprises allowing the polymerization to proceed until the N-vinylpyrrolidone content in the reaction mixture is from 5 to 1% by weight of the N-vinylpyrrolidone amount employed, substantially removing the organic solvent and other volatiles by distillation, adding water to the mixture, again adding a radical initiator and leaving the aqueous solution at from 50° to 100° C. for from 1 to 10 hours, and then removing volatile organic constituents virtually completely by a steam distillation.

The process according to the invention is especially suitable for preparing copolymers from A) 50 to 80% by weight N-vinylpyrrolidone,
B) 20 to 50% by weight of a vinyl ester and
C) 0 to 5% by weight of other copolymerizable monomers.

Suitable vinyl esters B are, in particular, those with from 4 to 8 carbon atoms, eg. vinyl propionate, vinyl butyrate, vinyl valerate and, especially, vinyl acetate.

Examples of other copolymerizable monomers C which can be used to modify the properties of the copolymer are acrylic or methacrylic acid, their methyl, ethyl, n-propyl, n-butyl or tert-butyl esters, styrene, vinyl chloride, cinylidene chloride, acrylonitrile, methacrylonitrile, acrylamide or methacrylamide. Carboxyl groups present in the copolymers are expediently neutralized, partially or completely, by amines, for example, 2-amino-2-methylpropanol, triisopropanolamine or 2-amino-2-ethylpropan-1,3-diol.

The copolymers are intended to have K values of from 10 to 50, preferably 20 to 30. The desired K value can be adjusted in a conventional manner by the choice of the polymerization conditions, for example its duration and the initiator concentration. The K values are measured by the method of Fikentacher, Cellulosechemie, 13 (1932), 58–64, in 1% by weight aqueous solution at 25° C. and represent a measure of the molecular weight.

Copolymers of this type normally have glass transition temperatures of from 50° to 150° C., in particular from 80° to 130° C.

Organic solvents which are particularly used are alkanols with 1 to 4 carbon atoms such as methanol, ethanol, n-propanol, n-butanol, and, in particular, isopropanol and sec-butanol, but also, for example, acetone, tetrahydrofuran or dioxane.

The polymerization is normally carried out in the organic solvent at from 60° to 130° C., under atmospheric pressure, or autogenous pressure of superatmospheric pressure of protective gas. An example of a suitable protective gas is nitrogen.

The polymerization is continued until the N-vinylpyrrolidone content in the reaction mixture is from 5 to 1% by weight, preferably 3 to 1% by weight, of the N-vinylpyrrolidone amount employed, it being possible to determine the amount of N-vinylpyrrolidone in the reaction mixture in a strightforward manner, for example by gas chromatography or iodine titration.

It proves to be advantageous for the monomers to be introduced into the reaction vessel in such a way that the total amount of component B has been introduced before completion of the addition of component A. This is because the vinyl ester B takes somewhat longer to reach the site of polymerization, owing to partial evaporation of the low-boiling monomer from the reaction mixture and condensation on the colder inside walls of the reaction vessel, which is why it is advisable to compensate for this by adding component B more rapidly.

Suitable radical initiators are usually those which decompose with a half-life of 10 hours at from 40° C. to about 130° C., and in particular 50° to 80° C. Examples of suitable radical initiators are dimethyl 2,2'-azobisisobutyrate, dilauroyl peroxide, dibenzoyl peroxide, dicumyl peroxide, di-tert-butyl peroxide, hydrogen peroxide and, in particular, percarboxylic esters such as tert-butyl perneodecanoate, tert-amyl perpivalate, tert-butyl perpivalate, tert-butyl peroxy-2-ethylhexanoate and tert-butyl perbenzoate.

It is advantageous to add the radical initiator continuously during the polymerization in order to ensure an approximately constant concentration of the initiator in the solution.

The polymerization in the organic solvent is followed by substantial removal of the organic solvent and other volatiles by distillation, for example under atmospheric pressure or reduced pressure or by steam distillation, in which case the use of superheated steam is particularly advantageous. The organic solvent which has been removed by distillation is replaced by water. Other volatiles which may be mentioned are, for example, unreacted vinyl ester, desensitizers from the commercial radical initiator formulations, and products of decomposition of the initiators.

Monomers which are still present in the resulting aqueous mixture are caused to react by again adding, preferably continuously, a radical initiator until the N-vinylpyrrolidone content in the reaction mixture is normally no greater than 0.1% by weight of the N-vinylpyrrolidone amount employed, by leaving the aqueous solution at from 50° to 100° C., preferably 60° to 90° C., for from 1 to 10 hours, preferably 3 to 6 hours. Normally used for this purpose are the same initiators as previously.

After this, organic solvent and other volatiles present are removed virtually completely by steam distillation, with the use of superheated steam being particularly advantageous.

The process according to the invention provides clear aqueous copolymer solutions which normally contain only traces of organic solvent. These solutions normally have a solids content of from 30 to 60% by weight and can immediately be employed further, in hair cosmetics for example.

The copolymers prepared by the process according to the invention are particularly distinguished by the fact that they form clear solutions in water because they contain distinctly fewer impurities than the same prior art copolymers and thus have no undesired intrinsic odor either. This is particularly important for use for hair treatment, such as in setting lotions or gels. The hair cosmetics containing these copolymers are thus more acceptable in health terms and better tolerated than comparable prior art agents.

EXAMPLES

The turbidity of the aqueous copolymer solutions was determined by nephelometry. In this method, the scattering of light after passing through the solution is determined by photometry, this scattering being caused by the interaction between the light rays and the particles or droplets in the solution, whose number and size determine the turbidity. The unit of measurement is the nephelometric turbidity unit (NTU) measure in a 10% by weight aqueous solution at 25° C. and based on calibration with formazin to produce standard turbidities. The NTU value is directly proportional to the turbidity of the solution.

The residual contents of N-vinylpyrrolidone and isopropanol in the solutions were determined by gas chromatography.

The K values are measured in 1% by weight aqueous solution at 25° C.

EXAMPLE 1

Copolymer of 61% by weight N-vinylpyrrolidone and 39% by weight vinyl acetate

A solution of 25.2 g of N-vinylpyrrolidone, 18.9 g of vinyl acetate and 0.2 g of tert-butyl perpivalate (75% by weight) in 88 g of isopropanol under a superatmospheric pressure of 0.3 bar of nitrogen was heated to 70° C. After the polymerization started, which was evident from an increase in viscosity, a mixture of 225.8 g of N-vinylpyrrolidone, 169.8 g of vinyl acetate and 314 g of isopropanol, and a solution of 2.4 g of tert-butyl perpivalats (75% by weight) in 24 g of isopropanol were added simultaneously at this temperature within 4 hours. Subsequently, a mixture of 44 g of N-vinylpyrrolidone and 37 g of isopropanol, and a solution of 0.6 g of tert-butyl perpivalate (75% by weight) in 6 g of isopropanol were added simultaneously within 1 hour at 70° C. The mixture was then stirred at 78° C. for 1 hour. After this, the reaction solution had an N-vinylpyrrolidone content of 5.1 g, corresponding to 1.7% by weight of the N-vinylpyrrolidone amount employed.

Isopropanol and volatiles were then removed by distillation with steam at 140° C. under 1.3 bar until the residual isopropanol content of the resulting aqueous solution was 1% by weight. The solids content of the solution was 51.4% by weight. The copolymer had a K value of 24.9. The turbidity of the produce was 3.9 NTU.

The resulting aqueous copolymer solution was heated to 80° C. and 1.3 g of tert-butyl perpivalate (75% by weight) dissolved in 50 g of isopropanol were added within 4 hours. The mixture was then stirred at the same temperature for 0.5 hour. After this, the reaction solution had an N-vinylpyrrolidone content of 0.15 g, corresponding to 0.05% by weight of the N-vinylpyrrolidone amount employed.

After this, isopropanol and volatiles were once again removed by distillation with steam at 140° C. under 1.3 bar until the residual isopropanol content of the solution was 0.3% by weight. The solids content of the solution was 50.7% by weight. The product had a K value of 25.8 and a turbidity of 1.0 NTU.

When the tert-butyl perpivalate (75% by weight) was replaced in the continuation of the reaction in aqueous medium by the same amount of tert-butyl peroxy-2-ethylhexanoate and the procedure was similar but at 90° C., the product had a turbidity of 2.9 NTU.

EXAMPLE 2

Copolymer of 70% by weight N-vinylpyrrolidone and 30% by weight vinyl acetate

A solution of 20.8 g of N-vinylpyrrolidone, 9.9 g of vinyl acetate and 0.12 g of tert-butyl perpivalate (75% by weight) in 40 g of isopropanol under a superatmospheric pressure of 0.3 bar of nitrogen was heated to 70° C. In a similar manner to Example 1, after the polymerization started, a mixture of 187 g of N-vinylpyrrolidone, 90 g of vinyl acetate and 225 g of isopropanol, and a solution of 1.7 g of tert-butyl perpivalate (75% by weight) in 24 g of isopropanol were added simultaneously and, thereafter, a mixture of 23 g of N-vinylpyrrolidone and 33 g of isopropanol, and a solution of 0.4 g of tert-butyl perpivalate (75% by weight) in 6 g of isopropanol were simultaneously added dropwise. The mixture was then stirred at 78° C. for 1 hour. After this, the reaction solution had an N-vinylpyrrolidone content of 3.7 g, corresponding to 1.6% by weight of the N-vinylpyrrolidone amount employed.

Distillation with superheated steam was carried out as in Example 1. After this, the reaction was continued in aqueous medium in a similar manner, by adding 0.9 g of tert-butyl perpivalate (75% by weight) dissolved in 50 g of isopropanol, until the reaction solution had an N-vinylpyrrolidone content of 0.21 g, corresponding to 0.09% by weight of the N-vinylpyrrolidone amount employed, and it was again distilled with superheated steam.

The solids content of the resulting solution was 49.5% by weight. The copolymer had a K value of 24.3. The turbidity of the product was 1.5 NTU.

EXAMPLE 3

Copolymer of 50% by weight N-vinylpyrrolidone and 50% by weight vinyl acetate

A solution of 20 g of N-vinylpyrrolidone, 24 g of vinyl acetate and 0.2 g of tert-butyl perpivalate (75% by weight) in 69 g of isopropanol under a superatmospheric pressure of 0.3 bar of nitrogen was heated to 70° C. In a similar manner to Example 1, after the polymerization started, a mixture of 180 g of N-vinylpyrrolidone, 220 g of vinyl acetate and 360 g of isopropanol, and a solution of 2.4 g of tert-butyl perpivalate (75% by weight) in 24 g of isopropanol were added simultaneously and, thereafter, a mixture of 44 g of N-vinylpyrrolidone and 37 g of isopropanol, and a solution of 0.6 g of tert-butyl perpivalate (75% by weight) in 6 g of isopropanol were simultaneously added dropwise. The mixture was then stirred at 78° C. for 1 hour. After this, the reaction solution had an N-vinylpyrrolidone content of 6.3 g, corresponding to 2.6% by weight of the N-vinylpyrrolidone amount employed.

Distillation with superheated steam was carried out as in Example 1. After this, the reaction was continued in aqueous medium in a similar manner, by adding 1.3 g of tert-butyl perpivalate (75% by weight) dissolved in 50 g of isopropanol, until the reaction solution had an N-vinylpyrrolidone content of 0.24 g, corresponding to 0.10% by weight of the N-vinylpyrrolidone amount employed, and it was again distilled with superheaded steam.

The solids content of the resulting solution was 53.1% by weight. The copolymer had a K value of 21.8. The turbidity of the product was 1.8 NTU.

COMPARATIVE EXAMPLE

Copolymer of 60% by weight N-vinylpyrrolidone and 40% by weight vinyl acetate 125 g of N-vinylpyrrolidone were copolymerized with 100 g of vinyl acetate in 250 g of isopropanol as in Example 8 of EP-B-104,042 to give a product with a K value of 26.1. The resulting solution was subjected to steam distillation as in Example 1. The turbidity of the resulting aqueous copolymer solution was 121 NTU.

We claim:

1. A process for preparing copolymers which form clear aqueous solutions from
   A) 45 to 90% by weight N-vinylpyrrolidone,
   B) 10 to 55% by weight of a vinyl ester and
   C) 0 to 10% by weight of other copolymerizable monomers by radical polymerization in an water miscible organic solvent in the presence of a radical initiator, and removal of the organic solvent and other volatiles by distillation, which comprises allowing the polymerization to proceed until the N-vinylpyrrolidone content in the reaction mixture is from 5 to 1% by weight of the N-vinylpyrrolidone amount employed, substantially removing the organic solvent and other volatiles by distillation, adding water to the mixture, again adding a radical initiator and leaving the aqueous solution at from 50° to 100° C. for from 1 to 10 hours, and then removing volatile organic constituents by a steam distillation.

2. A process for preparing copolymers which form clear aqueous solutions as claimed in claim 1, wherein the radical initiator is added continuously during reaction.

3. A process for preparing copolymers which form clear aqueous solutions as claimed in claim 1, wherein an alkanol with 1 to 4 carbon atoms is used as organic solvent.

4. A process as claimed in claim 1, which is used for preparing copolymers for which vinyl acetate is employed as component B.

* * * * *